Aug. 25, 1942.                T. B. PEPPER                2,294,201
          APPARATUS FOR SUBMARINE GEOPHYSICAL PROSPECTING
                  Original Filed July 17, 1939     5 Sheets-Sheet 1
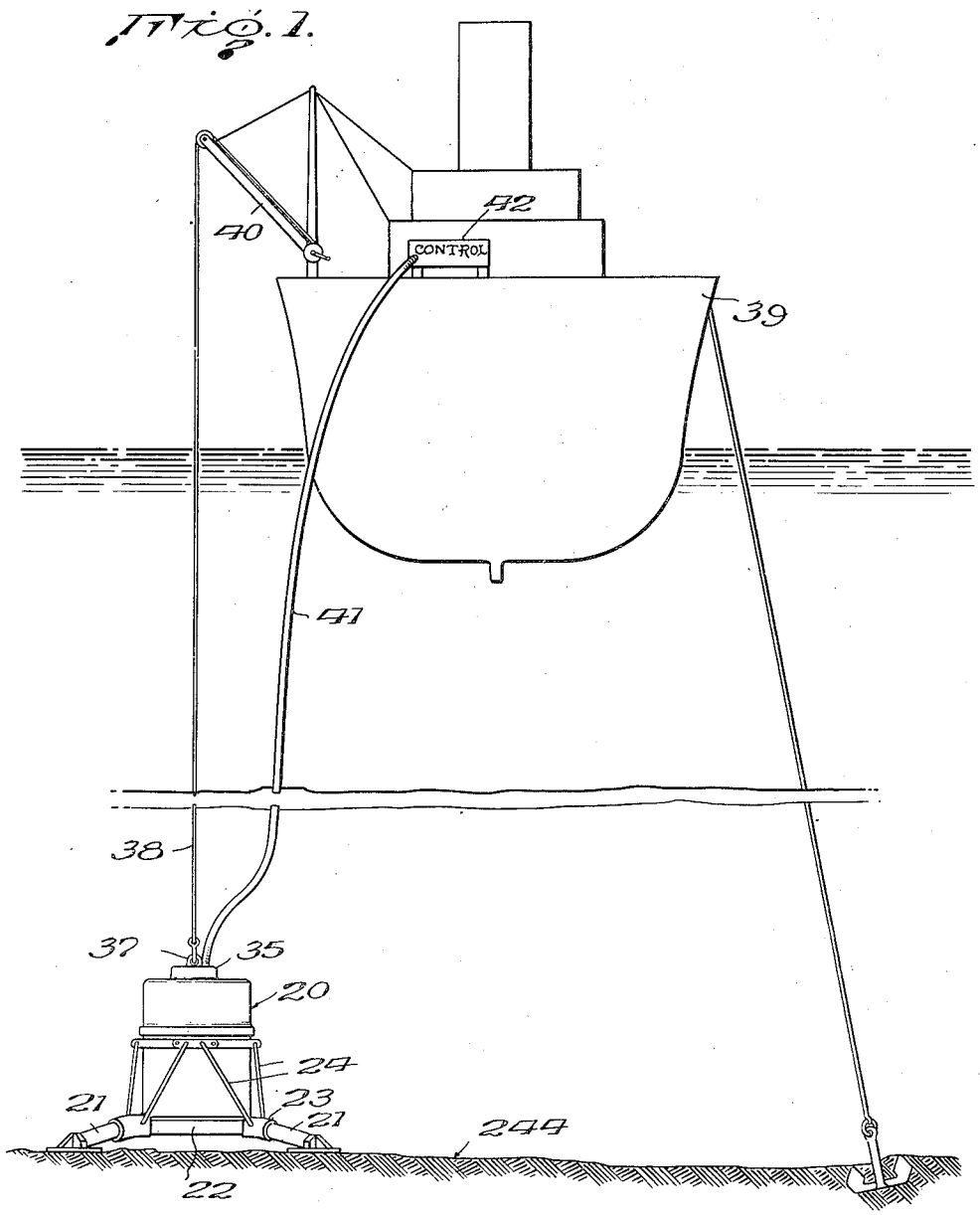

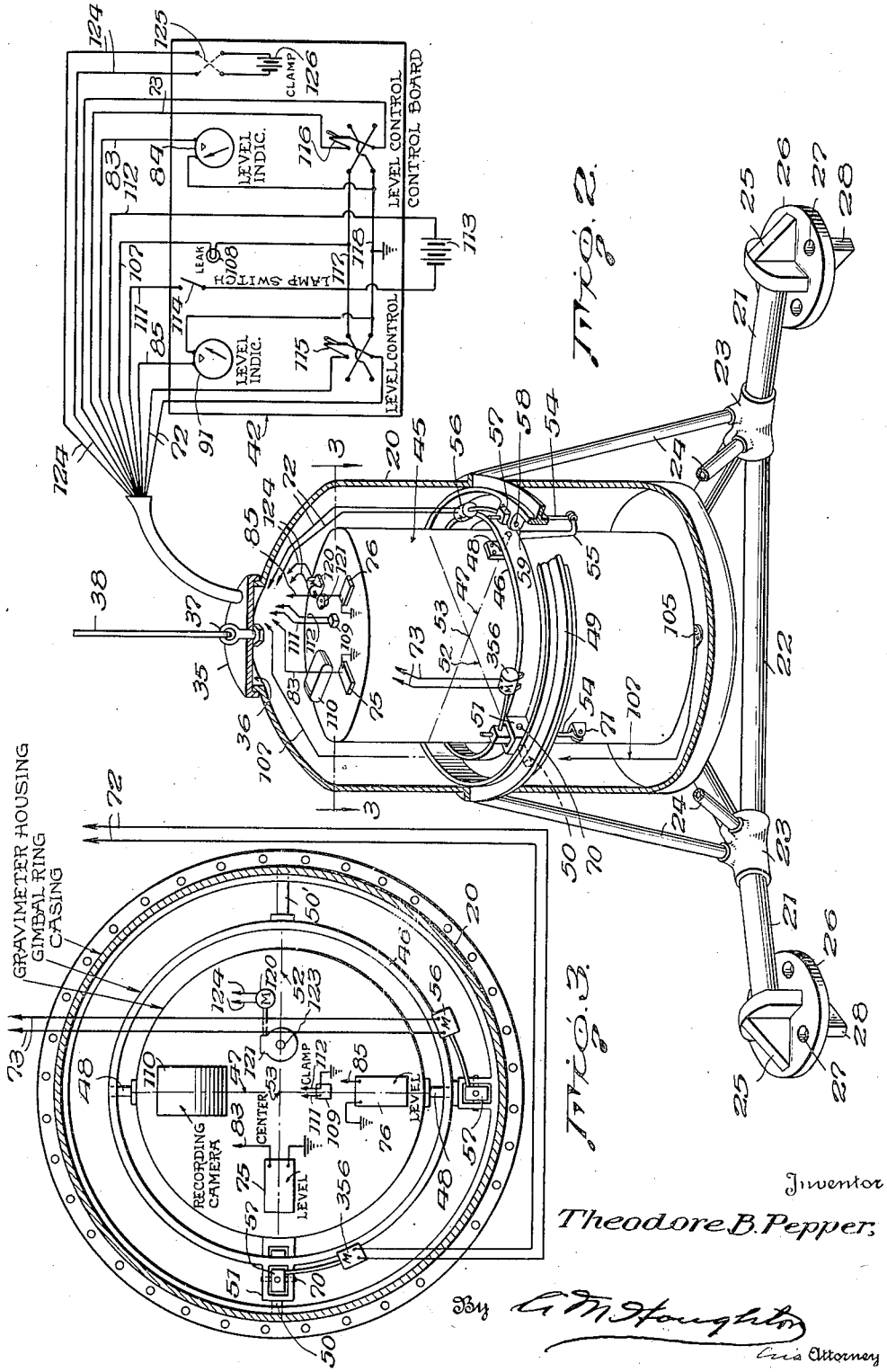

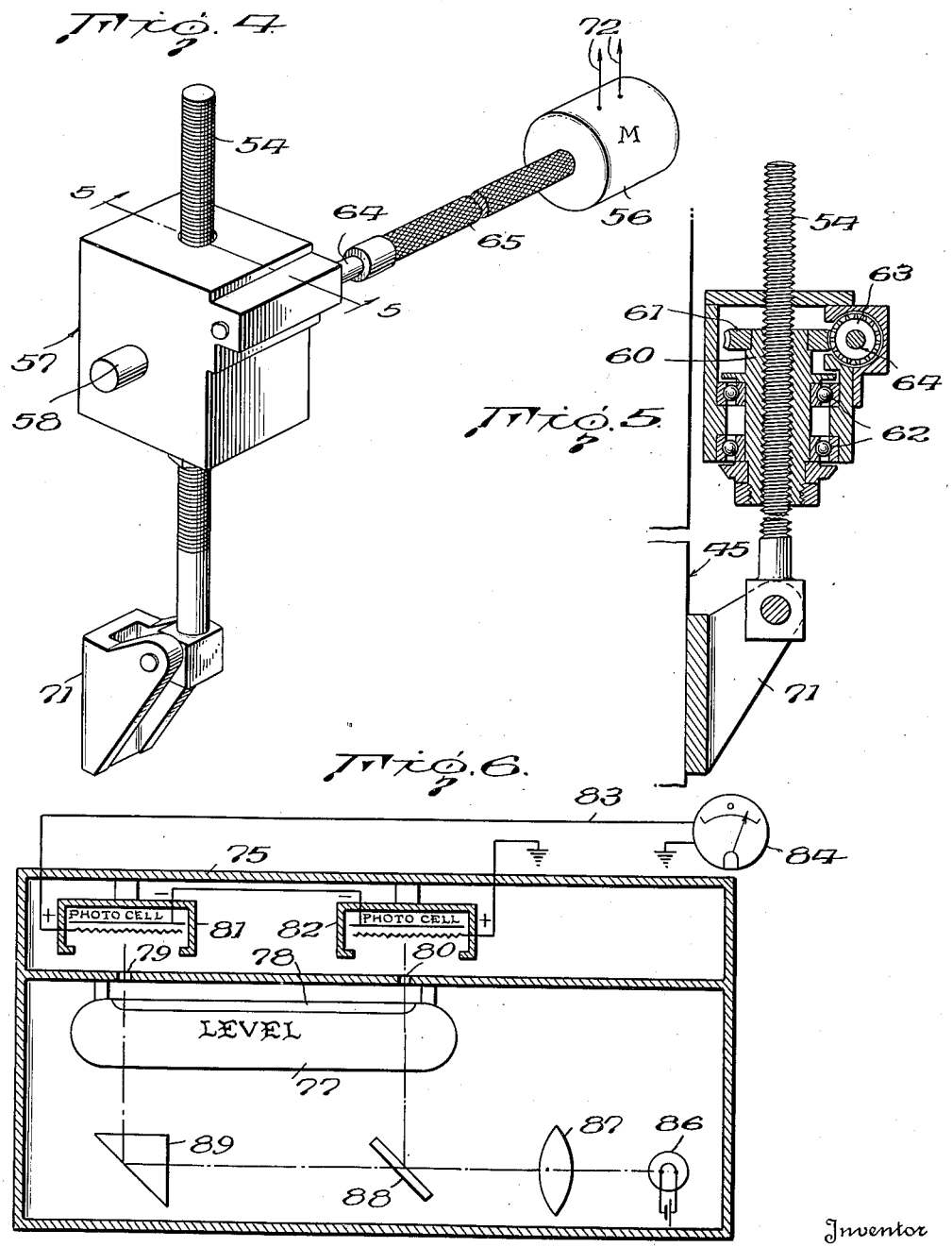

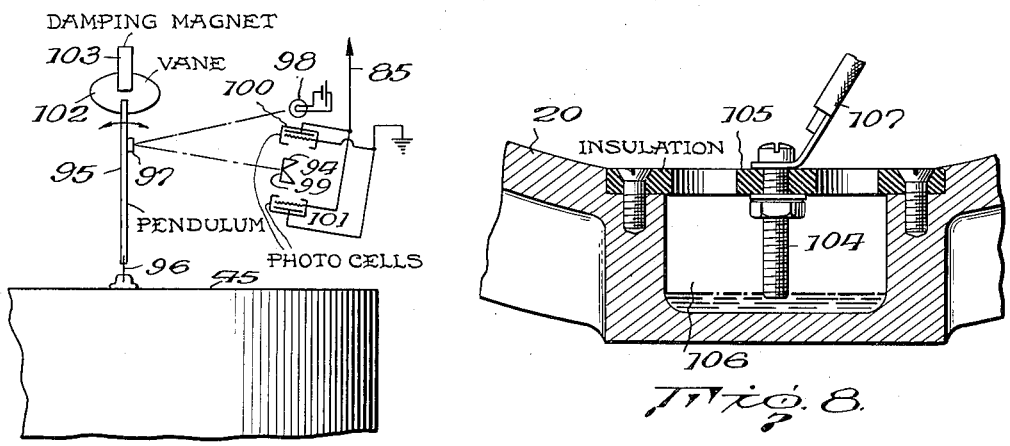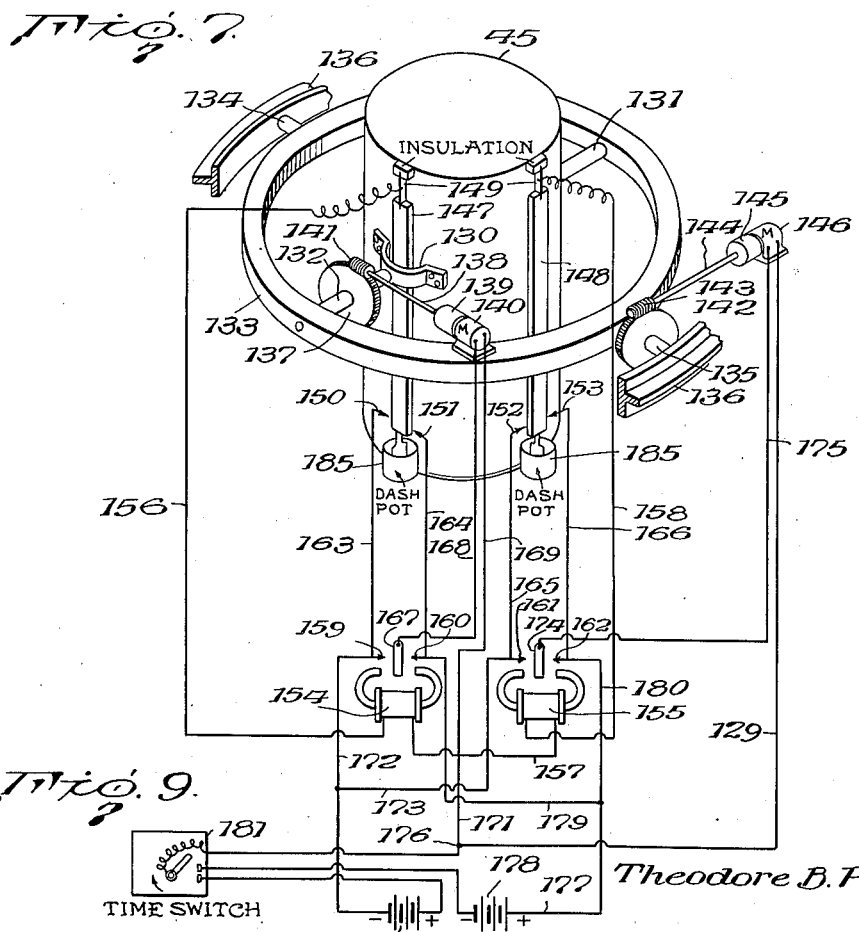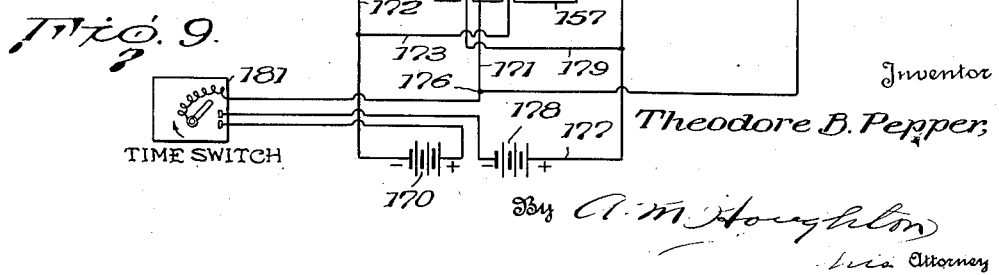

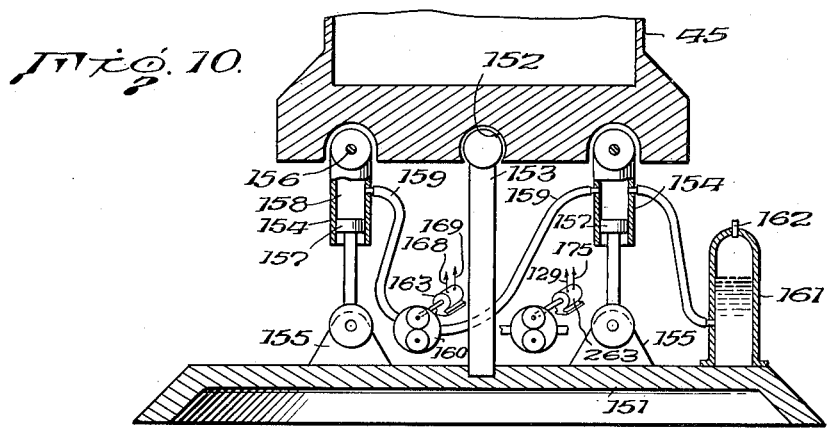
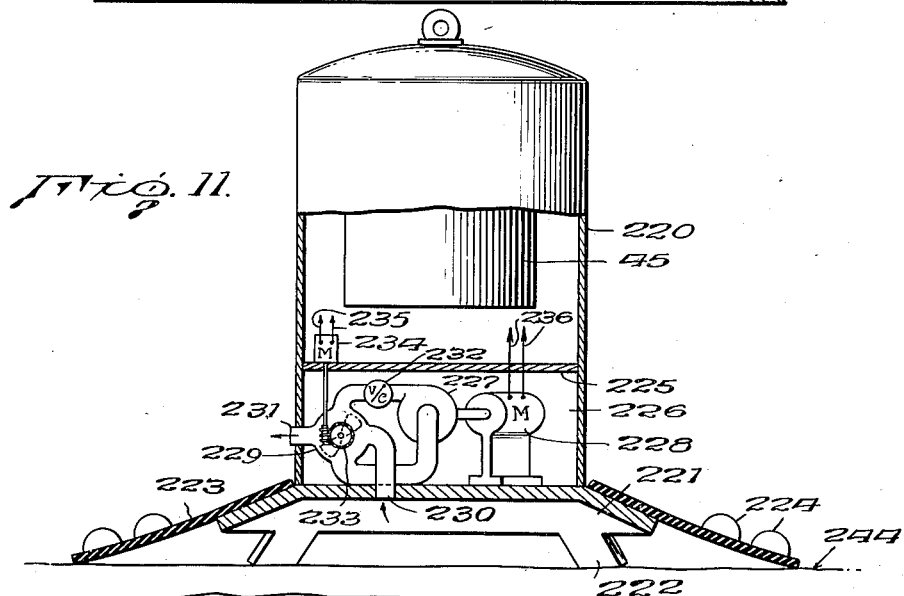
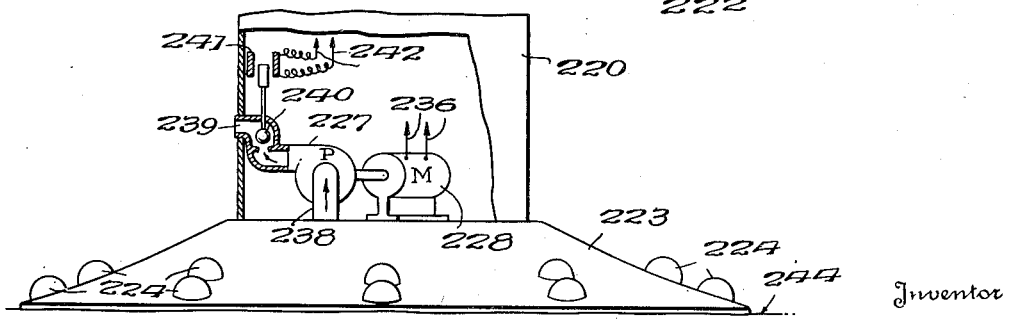

Patented Aug. 25, 1942

2,294,201

UNITED STATES PATENT OFFICE 2,294,201

APPARATUS FOR SUBMARINE GEOPHYSICAL PROSPECTING

Theodore B. Pepper, Oakmont, Pa., assignor to Gulf Research & Development Company, Pittsburgh, Pa., a corporation of Delaware Original application July 17, 1939, Serial No. 284,980. Divided and this application April 16, 1941, Serial No. 388,889

6 Claims. (Cl. 265—1.4)

This invention or discovery relates to apparatus for submarine geophysical prospecting; and more particularly to apparatus for making gravity measurements on the floors of oceans, lakes and other bodies of water.

This application is a division of my copending application, Serial No. 284,980, filed July 17, 1939, for Apparatus for submarine geophysical prospecting (now Patent 2,253,472) and reference is also made to my copending divisional and continuation-in-part application Serial No. 412,192, filed September 24, 1941, in which is claimed certain matter disclosed in the present application.

Geophysical prospecting procedures in which gravity measurements are utilized have largely been restricted to dry land. It has been a desideratum to be able to conduct explorations in territory covered by shallow seas, as oil is known to occur in the continental shelf of this and other continents. It is not in general feasible to carry out gravity measurements in boats or the like; the instruments require a solid footing. Attempts have been made to provide expedients for carrying out gravity measurements in shallow seas, etc., involving use of platform or submersible containers, but none has been of very general utility. The main difficulties are in securing a really stable footing for the instrument, particularly in the soft mud of lake bottoms; and, an even more serious problem, in providing for the extremely accurate leveling required for gravimetric devices. It is undesirable for various reasons to provide submarine vessels of a character enabling an operator to go below the surface with the instrument and operate it directly. The instrument must be operated by remote control.

One object of the present invention is the provision of an apparatus for making geophysical measurements on the floors of bodies of water, comprising a submersible support arranged to rest firmly on a lake or ocean floor, means for supporting a gravimeter or the like on the support for movement with respect thereto, and means for positively moving the gravimeter to bring it to accurate level position.

Another object is the provision of such an apparatus including means for actuating said leveling means by remote control from the surface and means for indicating the levelness of the gravimeter at the surface.

Another object is the provision of such an apparatus including means for positively holding the support against movement, on the ocean floor, by differential hydraulic pressure.

Another object is the provision of such an apparatus including means for restraining movement of the gravimeter with respect to the support, while the support is being lowered and raised, and arranged for causing movement of the gravimeter to level position prior to carrying out measurements.

These and other objects are achieved by the provision of an apparatus including a submersible support, weighted sufficiently to sink in water, and adapted to support a gravimeter or the like which is mounted so as to be capable of movement with respect to the support. Means are provided on the support for moving the gravimeter to level position, prior to taking observations. A suitable level-sensitive control is provided so that the gravimeter can be set stationary in true level position for measurement. The leveling means are automatically actuated by the level-sensitive control which arrests the leveling operation when level position is reached. Means are provided for clamping and unclamping the measuring instrument itself and for performing other functions necessary for making the actual gravity measurement. These means can be telemetric, i. e. operable from the surface, or automatic: self-contained within the submersible support and operating with a suitably delayed action.

In some cases provision is made for actuating the leveling means from the surface, by remote control, in which case the level-sensitive control is arranged to indicate at the surface when the gravimeter reaches level position; this modification being claimed in the acknowledged copending application.

The apparatus is ordinarily arranged to rest on the ocean bottom, but in apparatus for use in regions where there is considerable wave action, effective at the bottom, means are provided for holding the apparatus firmly against the bottom under differential hydraulic pressure; such means taking the form of a flexible skirt around the bottom of the apparatus and a suction pump within the apparatus for partially exhausting the space between the skirt and the ocean floor.

In the accompanying drawings there are shown, more or less diagrammatically, several examples of specific embodiments of apparatus within the purview of the invention. In the drawings, Fig. 1 is a general schematic view of the apparatus in position on an ocean floor, Fig. 2 is a perspective view of the submersible apparatus showing an embodiment in which the support includes a hermetically closed casing partly broken away to reveal the interior, Fig. 3 is a view in plan section taken along line 3—3 of Fig. 2, Fig. 4 is a perspective view of one of the two leveling means, Fig. 5 is a vertical sectional view taken along line 5—5 of Fig. 4, Fig. 6 is a diagrammatic view in vertical section, with some parts shown in elevation, of one form of level indicating means, Fig. 7 is a diagrammatic view in elevation of a modified form of level indicating means, Fig. 8 is a view in vertical section of the leakage indicating device, Fig. 9 is a diagrammatic perspective view of a gravimeter with self-leveling means to bring the instrument to approximate level, Fig. 10 is a diagrammatic view, partly in vertical section and partly in elevation, of a hydraulic form of leveling device arranged on an open base plate or support, Fig. 11 is a diagrammatic view of means for holding the casing to the bottom by suction, and Fig. 12 is a diagrammatic view of a simplified form of the apparatus of Fig. 11.

Referring to the drawings and more particularly to Figs. 1 to 8, the apparatus of the invention includes a water-tight submersible casing or chamber 20, having three tubular squat tripod legs 21 (only two show in the figures) joined to each other by tubes 22 and socket members 23, and supporting the casing by tubular struts 24 arranged as shown. The casing is disposed low on the tripod framework as shown, for stability. Each leg terminates at a bracket 25 to which is fastened a large disk 26, perforated at 27 to relieve suction upon raising the apparatus so as to avoid sticking of the apparatus in mud bottom. A prong 28 is provided for each disk, as shown, to anchor the tripod against lateral movement. The tripod and associated parts are advantageously of welded steel construction, with the parts of heavy enough material to afford the requisite rigidity and weight.

At the top of the casing is a detachable cover 35 giving access to the interior through manhole 36 and having an eyebolt 37 for connection of a cable 38 whereby the apparatus can be raised and lowered. The apparatus is operated from a ship 39, the derrick 40 of which is utilized for raising and lowering the casing. A multiwire electrical cable 41, insulated against sea water, leads from cover 35 to indicating and control apparatus 42 on the ship's deck. In operation of the apparatus cables 38 and 41 are paid out until several fathoms thereof lie on the ocean floor, so that the apparatus will not be disturbed by movement of the cables or the ship.

Within the casing is a gravimeter housing 45 of known type (see for example Hoyt U. S. Patent 2,131,737) and of generally cylindrical shape as shown. The gravimeter itself is of known construction and is not shown. Other gravimeters besides that of the Hoyt patent can, of course, be employed. The gravimeter housing is supported for movement with respect to the water-tight casing 20, by positively actuated gimbals including a gimbal ring 46 encircling the gravimeter housing and pivotally attached thereto, along one diameter 47 thereof, as indicated at 48. The ring in turn is pivotally attached to an outer stationary ring 49, by means of a pivot pin 50 engaging the ring 49 and a protruding bracket 51 on the gimbal ring, and an opposite pivot pin 50. Pivot pins 50 lie along a diameter 52 at right angles to diameter 47 and intersecting diameter 47 at central point 53. Thus the gravimeter housing is free to swing in all directions about point 53 as center. Center 53 is near the center of gravity of the instrument housing so that a minimum strain is put on the leveling mechanisms.

Means are provided for positively leveling the gravimeter housing with respect to the casing 20, and for indicating, on the ship, when level position is attained. Movement of the housing about diametral axis 52 is achieved by a threaded rod 54, pivotally attached to a clevis 55 fixed to the gimbal ring 46, and movable up and down by a motor 56 through the agency of a nut block 57 pivotally attached at 58 to a clevis 59 on outer ring 49. Block 57 contains a nut 60 carrying a worm wheel 61 and mounted for rotation in the block by antifriction bearings 62. The worm wheel is driven by a worm 63 on a shaft 64, connected to motor 56 by a flexible shaft 65. Thus, on operation of the motor 56 in the appropriate directions, threaded rod 54 is raised and lowered and gravimeter housing 45 is rocked about axis 52.

Movement of the gravimeter housing about axis 47 is achieved by another motor-driven nut assemblage similar to that described. Thus, on another side of the housing, a nut block 57 operated by a motor 356 is pivoted at 70 to bracket 51, and the lower end of its threaded rod 54 is pivoted to a clevis 71 attached to the gravimeter housing. The two motor-driven adjusting means are similar in construction. The motor 356, arranged to rotate the housing about axis 47, is supplied by leads 73 and the other motor 56 is supplied by leads 72. Each motor is operable independently from the ship by means hereinafter described.

A pair of telemetric levels 75 and 76 is provided, attached to the gravimeter housing parallel to axis 52 and 47 respectively. Fig. 6 shows one of the levels in detail. A sensitive level vial 77 is provided having an elongated bubble 78, arranged below a pair of slits 79 and 80 behind which are two photoelectric cells 81 and 82, advantageously of the well-known barrier-layer type as shown, connected electrically in opposition and to a galvanometer 84 on the control board (Fig. 2), by a lead 83. Ground forms the return circuit between the galvanometer and the level. The other level 76 has a corresponding lead 85 (Fig. 2) delivering to a galvanometer 91. A lamp 86 is arranged to direct light through a lens 87 and thence up through the level vial and the slits by means of a mirror 88 thinly silvered so as to reflect and transmit an equal amount of light, and a totally reflecting prism 89, all arranged as shown. When the bubble 78 is exactly centered the output of the cells cancels and the galvanometer reads zero. The telemetric level is thus of the null-indicating type. Movement of the bubble from level position changes the relative proportion of light reaching the two cells and the galvanometer reads plus or minus.

Fig. 7 shows a modified form of leveling means, of the inverted pendulum type. As shown, a rod-like pendulum 95 is mounted by a piece of thin clock spring 96 on the gravimeter housing 45. A small concave mirror 97 is affixed to the upper part of the pendulum and is arranged to focus light from a lamp 98 on to the edge 94 of a pair of 45-degree reflecting prisms 99 opposed by a pair of photocells 100 and 101 interconnected and delivering to galvanometer 91 through a lead 85, as in Fig. 2. These cells are connected similarly to cells 81 and 82 of Fig. 6 and play a similar function. When the pendulum is vertical the galvanometer reads zero. Movement of the pendulum from level causes light to be directed to one cell or the other, with a corresponding plus or minus reading on the galvanometer. A non-magnetic metal damping vane 192 is fitted to the top of the pendulum and moves in the gap of a permanent horseshoe magnet 103, to restrain vibration of the pendulum. Elements 98 to 103 are attached to the housing by suitable supports, omitted from the drawing for the sake of clarity of presentation. Two of the pendulum level-indicating devices are provided in practice, arranged at right angles as in the case of the bubble levels of Fig. 6.

Referring to Fig. 8, a leakage indicator is provided for the casing 20, comprising an electrode 104 supported by a perforate insulating disk 105 above a small sump 106 in the bottom of casing 20, and connected by a lead 107 with a lamp 108 on the control board (as described below) so that upon collection of bilge water in the sump the light flashes on. The sump capacity should be sufficiently large so that moisture condensed on the casing walls when the apparatus is lowered into cold water will not set off the signal.

The recording system includes a lamp housing 109 (corresponding to element 92 of the acknowledged Hoyt patent) and a recording camera 110 which takes the place of the eyepiece 100 of the Hoyt patent gravimeter. Lamp 109 is supplied by leads 111 and 112 connected to a battery 113 on the control board, through a switch 114. Means for clamping and unclamping the gravimeter proper are provided, including a reversible motor 120 driving, through a worm gear 121, a shaft 123 leading to the clamping mechanism (not shown). Shaft 123 corresponds to shaft 123 of the Hoyt patent. Wires 124 lead from the motor to a reversing switch 125 and a battery 126 on the control board. By manipulating the switch the gravimeter proper is clamped and unclamped.

The control board (Fig. 2) includes a pair of double-pole-double-throw motor switches, 115 and 116, arranged in parallel with battery 113 as shown by leads 117 and 118. Motor leads 72 and 73 are connected to the two switches as shown, and the battery is connected across the leads 117 and 118.

In operation, the casing is lowered to the sea bottom by line 38, and sufficient lengths of line 38 and cable 41 are then paid out to leave plenty of slack. The lower few fathoms of line and cable should rest on the ocean bottom. Then the gravimeter housing is leveled by manipulation of motor switches 115 and 116, which control motors 56 and 356. Level is indicated by galvanometers 84 and 91. When level is attained, the instrument is unclamped (switch 125) and time is allowed for stable conditions to be reached. The camera continuously records the gravimeter indication. After a suitable lapse of time (a few minutes) the instrument is clamped (switch 125) and the casing raised to the surface; or the casing can be shifted to a new position without raising it to the surface.

It is sometimes convenient to provide automatic leveling means, embodied in the casing 20, so as to simplify operations. Fig. 9 shows one good positive self-leveling arrangement. The gravimeter housing 45 is fitted with two brackets 130 (only one shows in the drawing) having fixed thereto shafts 131 and 132 rotatably mounted in a gimbal ring 133 which in turn has two shafts 134 and 135 rotatably mounted in a ring 136 similar to ring 49 of Fig. 2. Shaft 132 carries a worm wheel 137 driven through a worm 141, a shaft 138 and speed reducer 139, by a reversible motor 140. Shaft 135 has a similar worm wheel 142 driven by worm 143, shaft 144, speed reducer 145 and a reversible motor 146. A pair of conductive pendulums 147 and 148 are suspended from the gravimeter housing by clock springs 149, for oscillation in the directions of the two axes of the gimbals. Each pendulum opposes a pair of contacts 150 and 151 and 152 and 153, respectively, fixed to the housing. The pendulums are adapted to energize the motors by an electrical circuit including two polarized relays 154 and 155, the coils of which are connected in series with the pendulum supports as shown, by leads 156, 157 and 158. The fixed contacts 159 and 160, 161 and 162, respectively, of the relays are connected to pendulum contacts 150, 151, 152 and 153, by leads 163, 164, 165 and 166. The armature 167 of relay 154 is connected at 168 to one side of motor 140 and the other side of this motor is connected to lead 157, by a lead 169, and thence to one side of a battery 170, by a lead 171 and time switch 181. The other side of the battery is connected to relay contacts 159 and 161 by leads 172 and 173. Armature 174 of relay 155 is connected to one side of motor 146, by a lead 175, the outer side of the motor being connected by a lead 129 to lead 171 at 176. A second battery 178 is connected to relay contacts 160 and 162, by leads 177, 179 and 180. A time switch 181 is connected between point 176 and batteries 170 and 178 to energize the electrical circuit after a predetermined length of time.

In operation, the apparatus is lowered to the ocean floor. In due course the time switch closes. If the gravimeter housing is off level, as it almost always is, one of or both the pendulums 147 and 148 will be resting against a contact (150, 151, 152 and 153). This completes a circuit through the appropriate motor 140 or 146 to drive the housing into level position. For example: assuming pendulum 147 to be resting against contact 150, a circuit is completed through hinge 149, lead 156, the coil of relay 154, lead 171, battery 170, lead 172 and lead 163, thereby energizing the relay coil and moving armature 167 to the left. In this position the armature closes a circuit through motor 140, lead 168, the armature (167), lead 172, battery 170, lead 171 and lead 169, thereby causing the motor to swing the housing clockwise. When pendulum 147 is free of contact 150 the motor circuit is broken.

The pendulums are best made as long as convenient, say two feet or longer. A 2-foot pendulum can be made to indicate slightly less than 10 seconds leveling error if the contacts 150 and 151 are placed 0.001 inch on each side of the pendulum at the level position. It is advisable to provide a dash pot 185 or equivalent damping means to restrain vibration of the pendulum.

To avoid the possibility of hunting, that is to say successive overshooting of the level position, it is best to have motors 140 and 146 stop abruptly when the level position is reached. This is accomplished by employing a motor with light rotating parts, and a considerable gear reduction.

It is also helpful to have the motors accelerate gradually. This can best be done by employing an interrupter to supply voltage to the motors for only a fraction of the total time. This is better than reducing the applied voltage because motor operation is uncertain when the voltage is reduced too low. Another desirable refinement is to fit gears 142 and 137 rather loosely on their corresponding shafts 135 and 132, for friction drive so that only a fraction of the motor torque is transmittable to the shaft. This force limiting means allows the gravimeter housing to come very close to level position by ordinary gimbal effect. The shafts simply rotate while the worm gears remain stationary. The friction drive, however, readily transmits the very small amount of torque required to bring the apparatus to true level position.

Fig. 10 illustrates a slightly different embodiment of the invention in which the instrument housing is not encased by the submersible support and in which hydraulic means is employed to restrain movement of the instrument with respect to the support during raising and lowering thereof and to level the instrument when the support is at rest on the ocean floor. The instrument housing 45 is mounted on a base 151 of a submersible support, on a ball-headed standard 153 engaging a spherical seat 152 in the housing base. A pair of hydraulic struts is provided along one diameter of the housing, each including a cylinder 154 pivoted at 156 to the gravimeter housing base, and a piston 157 pivoted to a clevis 155 fixed to the base of the support. A similar pair of struts is provided along a diameter at right angles to the plane of the drawing; this pair of struts being omitted for the sake of clarity. A gear pump 160 is provided for each pair of struts, and is connected by tubes 159 with the cylinders. An air reservoir 161 with an air valve 162 for adjustment of the air pressure, forms a compensation means for the varying amounts of liquid in the struts and tubes. The geared pumps are driven by motors 163 and 263 which take the place of motors 146 and 140 in Fig. 9 and which are operated in the same manner, through leads 168 and 169, and 129 and 175 (of Fig. 9). The tubing and cylinders in practice are filled with oil or other suitable liquid, not shown. The motors, leads, and other working parts are of suitable water-proof construction.

In the embodiment of Fig. 10 the instrument housing 45 is hermetically sealed and the level-indicating mechanism, camera and other associated parts are enclosed within the housing 45. This embodiment has the advantage that the sealed casing associated with the instrument support can be dispensed with, thus providing a complete assemblage of somewhat less weight which can be more readily raised and lowered. The embodiment of Fig. 10 is well suited to operation in quiet waters.

In some coastal regions there are strong currents due to tidal or other effects, and in underwater surveying apparatus for use in such places, I find it advantageous to provide means for positively holding the submersible casing against the bottom under differential pressure. Referring to Fig. 11, the submersible casing 220 is provided with a flaring base 221 having short feet 222, and a rubber apron or skirt 223 is provided around the bases as shown, to act as an enormous suction cup or sucker. Weights 224 hold the apron against the bottom 244. Casing 220 has a bulkhead 225 defining a lower space 226 separate from the gravimeter chamber. A centrifugal pump 227 driven by a motor 228 is connected through a four-port valve 229 with an conduit 230 opening below base 221, and a conduit 231 extending through the casing. A check valve 232 is fitted in the pump outlet as shown. The four port valve is operable by gearing 233 and a reversible motor 234 having power supply leads 235 running up through cable 41 (not shown in Fig. 11) to the ship. Motor 228 has leads 236 also extending to the ship.

In operation, when the casing reaches bottom, motor 228 is operated, with valve 229 in the position shown, to exhaust the space enclosed by the rubber skirt whereupon the casing is held very tightly to the bottom under hydrostatic pressure. Check valve 232 holds the suction when the motor is stopped. To release the suction, valve 229 is turned to its other position and motor 228 is operated again.

Fig. 12 shows a simplified apparatus for achieving the same result as in Fig. 11. Pump 227 has its intake connected directly with the space below skirt 223, by a conduit 238 and discharges through a conduit 239 fitted with a check valve 240 operable by a solenoid 241 having leads 242. The check valve holds the suction while measurements are being made, and is opened when the instrument is to be raised, by energization of the solenoid.

In all the apparatus described, the parts exposed to water are made of material appropriate for such exposure, such as bronze, painted steel or stainless steel. The apparatus is useful with other gravity measuring instruments besides gravimeters, e. g. torsion balances.

What I claim is:

1. An apparatus for submarine geophysical prospecting comprising in combination a casing adapted to rest stationary on the floor of bodies of water, a geophysical instrument in said casin, mounting means for the instrument so constituted as to permit tilting of the instrument with respect to the casing through an angular range adequate to permit leveling the instrument, level-responsive means in fixed relation to the instrument responsive to departure of the instrument from level in at least two angularly different planes, at least two power-operated instrument-tilting means within the casing adapted on actuation thereof to tilt the instrument toward level in at least two angularly different planes, at least two control means each associated with said power-operated tilting means and with said level-responsive means and so constituted as to cause operation of the tilting means upon departure of the level-responsive means from level in any of the planes to the level in which it responds, and to render the tilting means inoperative on attainment of level in all planes.

2. An apparatus for submarine geophysical prospecting comprising in combination a casing, a geophysical instrument supported within said casing above the center of gravity of the instrument in such a manner as to permit the instrument to move to an approximately level position under the influence of gravity, driven means adapted to move said instrument on said support, driving means in frictional engagement with said driven means and so adjusted that the friction is overcome by the weight of the instrument when substantially off level and power means for operating said driving means to accurately level the instrument.

3. An apparatus for submarine geophysical prospecting comprising in combination a casing adapted to rest stationary on the floor of bodies of water, a geophysical instrument located within said casing, at least two power-operated tilting means within the casing operating in at least two angularly-displaced planes and adapted on actuation thereof to tilt the instrument toward level, level-responsive means in fixed relation to the instrument responsive to departure of the instrument from level in at least two different angularly-displaced planes, and electrical control circuit means between the level-responsive means and the plurality of power-operated tilting means, so constituted as to render the tilting means operative upon departure of the level-responsive means from level in any of the planes to level in which the level-responsive means responds, and to render the tilting means inoperative on attainment of level in all planes.

4. In a submarine geophysical prospecting apparatus of the type combining a submersible casing, a geophysical instrument in said casing, and support means effectual to pivot the instrument in the casing above the center of gravity of the instrument to allow level adjustment of the instrument to approximately level position by gravity effect: the improvement comprising electrical power means in the casing, a drive connection between the power means and the support means, for moving the instrument into correct level position, and a slippage-providing means in said connection, capable of transferring only a limited amount of torque between the power means and the support means, whereby said leveling of the instrument to approximate position by gravity is permitted.

5. Apparatus for submarine geophysical prospecting comprising in combination a supporting container adapted to rest stationary on the floor of bodies of water, a geophysical instrument within the container, adjustable means for supporting the instrument at various inclinations in the container, driving means adapted on operation to move the instrument-supporting means with respect to the container, to level the instrument, electrical level responsive means in fixed relation to the instrument, electrical power means connected to the driving means for operation thereof, control means for said power means, and an operative connection between the power control means and the level responsive means whereby on departure of the instrument from level the power means is operated to urge the instrument supporting means toward level; and when level is attained such movement is arrested.

6. The apparatus of claim 5 wherein the electrical control means includes a switch controlling the electrical power means, and an operating connection between the switch and the level-responsive means, such that upon departure of the instrument supporting means from level position the switch is closed and the power means operate to move said supporting means toward level position, and upon attainment of level position the switch is opened.

THEODORE B. PEPPER.